United States Patent Office 2,762,804
Patented Sept. 11, 1956

2,762,804

3-METHYL-5-PHENYL-2,6-PIPERAZINEDIONE AND DERIVATIVES THEREOF AND METHOD OF PREPARING SAME

Sidney R. Safir, River Edge, N. J., and Joseph J. Hlavka, Cambridge, Mass., assignors to American Cyanamid Company, New York, N. Y., a corporation of Maine No Drawing. Application October 8, 1954, Serial No. 461,279

13 Claims. (Cl. 260—268)

This invention relates to a series of new organic compounds. More particularly, this invention relates to 3-methyl-5-phenyl-2,6-piperazinedione, $N^1$ and $N^4$ derivatives thereof, and methods for their manufacture.

The compounds of the present invention may be represented by the following general formula:

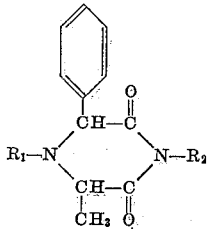

wherein $R_1$ is a member selected from the group consisting of hydrogen, lower alkyl, lower carboalkoxy, carboaralkyloxy and acyl radicals, and $R_2$ is a member selected from the group consisting of hydrogen and lower alkyl radicals. The terms "lower alkyl" and "lower carboalkoxy" are used herein to include all alkyl and carboalkoxy radicals containing from 1 to 6 carbon atoms such as for example, methyl, ethyl, propyl, isopropyl, butyl, isobutyl, pentyl, isopentyl, hexyl, carbomethoxy, carboethoxy, carbopropoxy, carbobutoxy, carbopentoxy and carbohexoxy. A suitable carboaralkyloxy substituent substitutable in the $R_1$ position is the carbobenzyloxy. As examples of suitable acyl radicals substitutable in the $R_1$ position may be given acetyl, propionyl, butyryl and the like. Certain of the compounds of the present invention—namely, the parent compound 3-methyl-5-phenyl-2,6-piperazinedione and the $N^4$ alkyl substituted derivatives thereof are capable of reacting with mineral acids such as hydrochloric acid to form the corresponding acid addition salts. It is, therefore, intended that these salts also be included within the scope of the present invention. Likewise, the $N^1$ unsubstituted 3-methyl-5-phenyl-2,6-piperazinediones, i. e., those containing a hydrogen atom in the 1-position, may be treated with a suitable base, as for example, an alkali metal alkoxide such as sodium or potassium hydroxide to yield the corresponding metal salts.

The compounds of this invention are useful in the pharmaceutical field. We have found that they are particularly advantageous as anticonvulsants, being effective in varying degrees, against seizures of both the grand mal and petit mal types.

The compounds of our invention can be prepared from previously known organic compounds by a novel series of chemical transformations which we have discovered. In these syntheses there are involved a number of new intermediate organic compounds and it is intended that these be included within the scope of our invention.

The nuclear compound of this invention—namely 3-methyl - 5 - phenyl - 2,6 - piperazinedione, contains two asymmetric carbon atoms and, therefore, may exist in four optical isomeric forms (two racemic pairs). Stereoisomeric forms as used herein refer to the spatial arrangement of the polar groups on the two asymmetric carbon atoms with reference to cis and trans configurations.

Both the cis and trans forms exist as racemates of optically active dextro (d) and levo (l) rotatory isomers as well as in the form of the individual or separated dextro (d) and levo (l) optical isomers.

In view of the fact that the precise configuration of each of the racemic pairs of 3-methyl - 3 - phenyl-2,6-piperazinedione is unknown, we shall designate the precipitate obtained from the treatment of the optical isomeric mixture of 3-methyl-5-phenyl-2,6-piperazinedione with hydrochloric acid as the hydrochloride of "Racemic Pair B" and the filtrate thereof as the hydrochloride of "Racemic Pair A." These may be further characterized by the melting point characteristics of the bases derived from the hydrochloride salt, the lower melting isomer A having a melting point of 129° C. to 130° C., and the higher melting isomer B having a melting point of 182° C. to 186° C.

It will be understood that each of the $N^1$ and $N^4$ derivatives of 3-methyl-5-phenyl-2,6-piperazinedione of the present invention may be prepared from either Racemic Pair A or Racemic Pair B, or both.

Where no notation appears with a chemical name, the name is to be interpreted in its generic sense; that is, as representing the (dl) cis or (dl) trans optical racemates individually or as mixtures. In other words, a name represents not only the unresolved mixture of racemates but also the individual racemates of 3-methyl-5-phenyl-2,6-piperazinedione.

In accordance with our process, the 3-methyl-5-phenyl-2,6-piperazinediones of this invention may be prepared by converting the known compound α-(α'-carbethoxybenzylamino)propionitrile to the corresponding amide in dry methanolic hydrogen chloride. The reaction may be represented as follows:

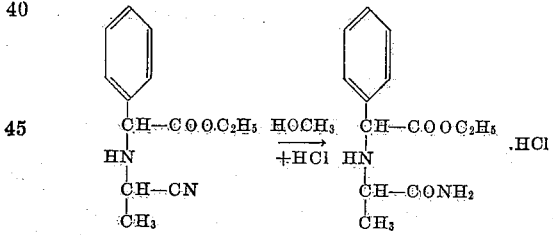

The resulting amide may then be condensed in the presence of sodium methoxide to yield the desired 3-methyl-5-phenyl-2,6-piperazinedione.

Separation of this product into its respective diasteroisomeric pairs may be effected by treatment with a mineral acid, such as hydrochloric, and cooling until the temperature reaches a level from about 0° C. to about 25° C. Advantageously the mixed product may be first dissolved in 1 N hydrochloric acid, and 12 N hydrochloric acid added thereto with cooling until maximum precipitation of solid has occurred. We have found that a temperature of about 16° C. is optimal. The solid, largely consisting of the hydrochloride of racemate B, is separated. The filtrate, containing the hydrochloride of racemate A, may then be subjected to further purification. Both of the racemates, A and B, are then obtained in the form of free bases by neutralization of the hydrochlorides with dilute aqueous alkali such as sodium or potassium hydroxide.

The various $N^1$ and $N^4$ substituted derivatives of 3-methyl-5-phenyl-2,6-piperazinedione may be prepared from either of the racemic pair A or B, by known methods. For example, to prepare $N^4$ derivatives one may employ the acylation technique by dissolving the piperazinedione in an inert, nonhydroxylic organic solvent and adding thereto the corresponding acid chloride. Substitution into the $N^1$ position may be readily accomplished by reacting the $N^4$ substituted piperazinedione with the corresponding alkyl halide in the presence of an alkali metal alkoxide and a suitable organic solvent such as β-ethoxyethanol, n-propyl alcohol, ethanol, isopropyl alcohol, dioxane or the like. The reaction may be carried out at normal room temperature, but it is preferred to effect the reaction at about 50° C.

Any one of a wide variety of solvents may be employed during the acylation reaction as for example, acetone, dimethyl formamide, dioxane, methyl ethyl ketone or the like.

The preparation of acid addition salts of the piperazinediones of this invention may be accomplished by treating the appropriate piperazinedione with a mineral acid as for example sulfuric acid or dry halogen chloride gas. Where a salt is desired of an $N^1$ substituted piperazinedione, the previously prepared $N^4$ acyl blocked piperazinedione must first be subjected to hydrogenation, preferably by treatment with atmospheric hydrogen over palladium-charcoal catalyst. The resultant product may then be reacted with the appropriate acid such as hydrochloric, sulfuric, picric or acetic.

In order to more fully illustrate the compounds contemplated by the present invention, the following examples are presented. All parts are by weight unless otherwise indicated.

EXAMPLE I

*Preparation of α-(α'-carbethoxybenzylamino)-propionamide hydrochloride*

20.6 grams of α-(α'-carbethoxybenzylamino)-propionitrile hydrochloride was suspended in 2.5 grams of dry methanol and 200 ml. of dry ether. The suspension was cooled to between 0° C. and —5° C. and saturated with dry hydrogen chloride gas. This mixture was kept at room temperature for 2 days, after which the precipitate was filtered and dried under reduced pressure. The crude hydrochloride was recrystallized from ethanol-ether solution to give a purified product melting at 188° C. to 190° C. (decomp.).

EXAMPLE II

*Preparation of 3-methyl-5-phenyl-2,6-piperazinedione*

A solution of 4.6 grams of sodium methoxide dissolved in 120 ml. of dry ethanol was added to a solution of 10.8 grams (0.038 mole) of α-(α'-carbethoxybenzylamino)-propionamide hydrochloride, the product of Example I, in 150 ml. of dry ethanol. The reaction mixture was kept at room temperature (30° C.) for 30 to 40 minutes and then concentrated under reduced pressure, keeping the temperature below 30° C., to a residual solid. A dilute aqueous hydrochloric acid solution containing 0.048 mole of hydrogen chloride was added to the residue, and the mixture was stirred. An oil separated and then crystallized. The crystals were filtered, washed with cold water, and dried, yielding piperazinedione melting at 120° C. to 165° C. This material is a mixture of 2 racemic pairs.

EXAMPLE III

*Separation and recovery of racemic pair A from the mixed product 3-methyl-3-phenyl-2,6-piperazinedione*

68.5 grams of mixed product, obtained as described in Example II, was dissolved in 570 ml. of 1 N aqueous hydrochloric acid and the mixture was filtered. 600 ml. of 12 N hydrochloric acid was added to the filtrate while cooling and stirring until the temperature was 16° C., by which point considerable solids had precipitated from solution. The solids (largely the hydrochloride racemate B) were filtered and put aside (see Example IV).

The filtrate (containing the bulk of the hydrochloride of racemate A) was concentrated under reduced pressure, keeping the temperature below 40° C., to a dry residue. The residue was treated with dilute aqueous alkali until the pH reached 5, at which point the mixture was filtered, yielding 40.4 grams of a solid melting at 126° C. to 173° C. This material still contained appreciable amounts of racemate B.

The 40.4 grams of mixed solid was dissolved in 350 ml. of 1 N hydrochloric acid and filtered. To the filtrate 350 ml. of 12 N hydrochloric acid was added with cooling and stirring until the temperature was 16° C. The solids were filtered and converted to free base by addition of dilute aqueous alkali, yielding essentially pure racemate A free base melting at 126.5° C. to 129.5° C., which, on recrystallization from ethyl alcohol melted at 129° C. to 130° C.

EXAMPLE IV

*Recovery of racemic pair B from the mixed product 3-methyl-3-phenyl-2,6-piperazinedione*

The solids rich in racemate B from Example III were suspended in water, and 5 N aqueous sodium hydroxide was added until pH 5. The free base was then filtered, yielding racemate B melting at 170° C. to 180° C. After recrystallization from ethanol, the product melted at 182° C. to 186° C.

EXAMPLE V

*Preparation of 4-carbobenzyloxy-3-methyl-5-phenyl-2,6-piperazinedione (racemate A)*

A mixture of 6.6 grams of 3-methyl-5-phenyl-2,6-piperazinedione (racemate A), 3.0 grams of carbobenzyloxychloride, and 20 ml. of dry acetone was warmed briefly on a steam-bath to give a clear solution. The solution was kept at room temperature for 4 days, after which the insoluble 3-methyl-5-phenyl-2,6-piperazinedione hydrochloride was filtered and the filtrate was concentrated under reduced pressure to a dry residue. The residue was slurried in cold ethanol and filtered, yielding the product which melted at 120° C. to 123° C.

EXAMPLE VI

*Preparation of 4-carbobenzyloxy-3-methyl-5-phenyl-2,6-piperazinedione (racemate B)*

A mixture of 6.1 grams of 3-methyl-5-phenyl-2,6-piperazinedione (racemate B), 2.8 grams of carbobenzyloxy chloride, and 20 ml. of dry acetone was warmed for a minute or two on a steam bath, during which time part of the solids dissolved, and a precipitate began to form. An additional 25 ml. of acetone was added, and the mixture was stored at room temperature for 7 days.

The insoluble 3-methyl-5-phenyl-2,6-piperazinedione hydrochloride was filtered, and the filtrate was concentrated under reduced pressure to yield 5.6 grams of light brown, viscous oil. The crude product was purified by evaporative distillation (145° C. to 150° C., 0.05 mm.) to give a light yellow, viscous glass which solidified and was pulverized to an amorphous powder.

EXAMPLE VII

*Preparation of 4-carbobenzyloxy-1,3-dimethyl-5-phenyl 2,6-piperazinedione (racemate A)*

0.71 gram of sodium methoxide was dissolved in 15 ml. of dry β-ethoxyethanol, and 4.0 grams of 4-carbobenzyloxy-3-methyl-5-phenyl-2,6-piperazinedione (racemate A), the product of Example V, was added. The clear solution was warmed to 50° C., and a solution of 2.3 grams of methyl iodide in 20 ml. of β-ethoxyethanol was added with stirring over the course of 7 minutes. After this, the mixture was stirred at 50° C. to 55° C. for an additional 5 minutes. The reaction mixture was then concentrated under reduced pressure to a dry residue. The residue was dissolved in chloroform, and the solution was washed 3 times with water, dried over anhydrous magnesium sulfate, and filtered. The filtrate was concentrated under reduced pressure to a light yellow, viscous oil which was the product.

EXAMPLE VIII

*Preparation of 1,3-dimethyl-5-phenyl-2,6-piperazinedione (racemate A) hydrochloride*

2.2 grams of 4-carbobenzyloxy-1,3-dimethyl-5-phenyl-2,6-piperazinedione (racemate A), the product of Example VII, was dissolved in absolute ethanol and decarbobenzyloxylated with atmospheric hydrogen and 0.7 gram of palladium-charcoal catalyst. The reaction mixture was filtered, and the filtrate was concentrated under reduced pressure to 2.2 grams of crude product, an oil. The oil was dissolved in dry ether, treated with activated charcoal, and filtered. The clear, almost colorless filtrate was cooled, and dry hydrogen chloride gas was bubbled through the solution. The white precipitate was filtered, washed with ether, and dried, yielding the hydrochloride of the piperazinedione melting at 200° C. to 220° C. (decomp). 1.8 grams was recrystallized from ether-methanol solution (plus a few drops of ethanolic hydrogen chloride) to give 1.0 grams of the product as white crystals melting at 225° C. to 232° C. (decomp.).

EXAMPLE IX

*Preparation of 4-dichloroacetyl-3-methyl-5-phenyl-2,6-piperazinedione (racemate B)*

12.2 grams of 3-methyl-5-phenyl-2,6-piperazinedione (racemate B), the product of Example IV, was added to a solution of 4.5 grams of dichloroacetyl chloride in 250 ml. of dry acetone, and the mixture was kept at room temperature for 4 days. The precipitate, 3-methyl-5-phenyl-2,6-piperazinedione hydrochloride, was filtered, and the filtrate was concentrated under reduced pressure to a dry residue. The residue was taken up in ethyl acetate, treated with activated charcoal, and filtered. The filtrate was concentrated under reduced pressure to about 40 ml., and petroleum ether was added, causing the product to crystallize. The crystals were filtered, washed and dried, yielding piperazinedione, melting at 148° C. to 154° C. This product was recrystallized from chloroform-petroleum ether solution to give the desired product, melting at 156° C. to 158° C.

The compounds of this invention may be further illustrated by the following:

3,4-dimethyl-5-phenyl-2,6-piperazinedione
3-methyl-4-ethyl-5-phenyl-2,6-piperazinedione
3-methyl-4-isobutyl-5-phenyl-2,6-piperazinedione
4-methoxy-3-methyl-5-phenyl-2,6-piperazinedione
4-butoxy-3-methyl-5-phenyl-2,6-piperazinedione
4-hexoxy-3-methyl-5-phenyl-2,6-piperazinedione
4-carboethoxy-3-methyl-5-phenyl-2,6-piperazinedione
4-carbopropoxy-3-methyl-5-phenyl-2,6-piperazinedione
4-ethyl-1,3-dimethyl-5-phenyl-2,6-piperazinedione
1,4-diethyl-3-methyl-5-phenyl-2,6-piperazinedione
4-carboethoxy-1,3-diethyl-5-phenyl-2,6-piperazinedione
4-acetyl-1-butyl-3-methyl-5-phenyl-2,6-piperazinedione
4 - propionyl - 1 - butyl - 3 - methyl - 5 - phenyl - 2,6-piperazinedione
4-butyryl-3-methyl-5-phenyl-2,6-piperazinedione
4 - carbobenzyloxy - 1 - butyl - 3 - methyl - 5 - phenyl-2,6-piperazinedione
4 - carbopropoxy - 1 - isopropyl - 3 - methyl - 5 - phenyl-2,6-piperazinedione
4 - ethoxy - 1 - isobutyl - 3 - methyl - 5 - phenyl - 2,6-piperazinedione

We claim:
1. Compounds having the formula:

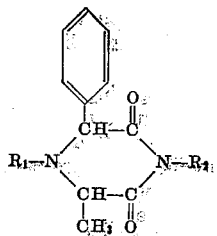

wherein $R_1$ is a member selected from the group consisting of hydrogen, carbobenzyloxy, and dichloroacetyl radicals, and $R_2$ is a member selected from the group consisting of hydrogen and lower alkyl radicals, the nontoxic acid addition and alkali metal salts thereof.

2. The 1 - lower alkyl - 3 - methyl - 5 - phenyl - 2,6-piperazinediones.

3. The new compound 3-methyl-5-phenyl-2,6-piperazinedione.

4. The new compound dl-trans-4-carbobenzyloxy-3-methyl-5-phenyl-2,6-piperazinedione.

5. The new compound dl-cis-4-carbobenzyloxy-1,3-dimethyl-5-phenyl-2,6-piperazinedione.

6. The new compound dl-cis-1,3-dimethyl-5-phenyl-2,6-piperazinedione.

7. The new compound dl-trans-4-dichloroacetyl-3-methyl-5-phenyl-2,6-piperazinedione.

8. A method for preparing compounds having the formula:

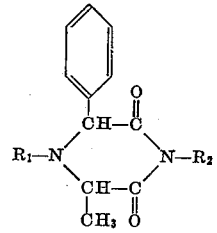

wherein $R_1$ is a member selected from the group consisting of hydrogen, carbobenzyloxy and dichloroacetyl radicals, and $R_2$ is a member selected from the group consisting of hydrogen and lower alkyl radicals, which comprises treating α-(α'-carbethoxybenzylamino)propionitrile with a mineral acid in the presence of a lower alkyl alcohol and condensing the resulting α-(α'-carbethoxybenzylamino)propionamide in the presence of an alkali metal lower alkoxide, to obtain 3-methyl-5-phenyl-2,6-piperazinedione, and then treating said compound with a member selected from the group consisting of carbobenzyloxy chloride and dichloroacetyl chloride whereby the hydrogen atom in the $N^4$ position of 3-methyl-5-phenyl-2,6-piperazinedione is selectively replaced with a member selected from the group consisting of carbobenzyloxy and dichloroacetyl radicals.

9. A method for preparing compounds having the formula:

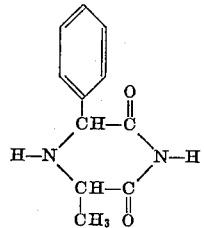

which comprises treating α-(α'-carbethoxybenzylamino)-propionitrile with a mineral acid in the presence of a lower alkyl alcohol and condensing the resulting α-(α'-carbethoxybenzylamino)propionamide in the presence of an alkali metal lower alkoxide to obtain 3-methyl-5-phenyl-2,6-piperazinedione.

10. A method for preparing 4-carbobenzyloxy-3-methyl-5-phenyl-2,6-piperazinedione which comprises treating 3-methyl-5-phenyl-2,6-piperazinedione with carbobenzyloxychloride.

11. A method for preparing 4-carbobenzyloxy-1,3-dimethylphenyl-2,6-piperazinedione which comprises treating 4-carbobenzyloxy-3-methyl-5-phenyl-2,6-piperazinedione with methyl iodide in the presence of sodium methoxide and β-ethoxyethanol.

12. A method for preparing 4-dichloroacetyl-3-methyl-5-phenyl-2,6-piperazinedione which comprises treating 3-methyl-5-phenyl-2,6-piperazinedione with dichloroacetyl chloride.

13. A method for separating 3-methyl-5-phenyl-2,6-piperazinedione into its cis and trans forms, which comprises the step of fractionally crystallizing the mixture of hydrochlorides of dl-cis-3-methyl-5-phenyl-2,6-piperazinedione and dl-trans-3-methyl-5-phenyl-2,6-piperazinedione.

References Cited in the file of this patent

Ciamician et al.: Ber. Deut. Chem. 39, 3942–59 (1906).
Jonkees: Rec. Trav. Chim. 27, 287–326 (1908).
Franchimont et al.: Rec. Trav. Chim. 36, 80–109 (1916).
Dubski et al.: Ber. Deut. Chem. 66, 1497–98 (1933).
Stewart et al.: J. Org. Chem. 13, 134–43 (1948).